United States Patent [19]

Morinaka

[11] Patent Number: 5,631,860
[45] Date of Patent: May 20, 1997

[54] CARRY SELECTING SYSTEM TYPE ADDER

[75] Inventor: Hiroyuki Morinaka, Itami, Japan

[73] Assignee: Mitsubishi Denki Kabushiki Kaisha System LSI Kaihatsu Kenkyusho, Itami, Japan

[21] Appl. No.: 461,011

[22] Filed: Jun. 5, 1995

[30] Foreign Application Priority Data

Dec. 1, 1994 [JP] Japan .................................. 6-298460

[51] Int. Cl.$^6$ ........................................................ G06F 7/50
[52] U.S. Cl. ........................................ 364/787; 364/788
[58] Field of Search ................................. 364/788, 787

[56] References Cited

U.S. PATENT DOCUMENTS 4,764,888  8/1988  Holden et al. ............................ 364/788

FOREIGN PATENT DOCUMENTS 6-298460  12/1994  Japan .

OTHER PUBLICATIONS

Tan, K. G., Binary Exclusive–OR Carry, IBM Technical Disclosure Bulletin, pp. 747–748 Oct. 1965.
Tyagi, Akhilesh, A Reduced Area Scheme for Carry–Select Adders, IEEE Transactions on Computers, vol. 42, No. 10, pp. 1163–1170 Oct. 1993.

*Primary Examiner*—Paul P. Gordon
*Assistant Examiner*—Robert J. Dolan
*Attorney, Agent, or Firm*—Oblon, Spivak, McClelland, Maier & Neustadt, P.C.

[57] ABSTRACT

An adder including a first exclusive OR device, a second exclusive OR device for receiving an output of the first exclusive OR device and a generating signal G(i−1), exclusive ORing the output result of the first exclusive OR device and the generating signal G(i−1), and outputting the calculated result as a sum Si0, and a third exclusive OR device for receiving an output of the second exclusive OR device and a propagating signal P(i−1), exclusive ORing the output result of the second exclusive OR device and the propagating signal P(i−1), and outputting the calculated result as a sum Si1, whereby the amount of hardware and power consumption of the adder used in a carry selecting system is reduced.

6 Claims, 6 Drawing Sheets

| | $G_{i-1}$ | $P_{i-1}$ | $S_{i0}$ | $S_{i1}$ | CARRY INPUT | TRUTH SUM |
|---|---|---|---|---|---|---|
| I | 0 | 0 | ($X_i$) | $X_i$ | 0 | $X_i$ |
| I | 0 | 0 | $X_i$ | ($X_i$) | 1 | $X_i$ |
| II | 1 | 0 | ($\overline{X_i}$) | $\overline{X_i}$ | 0 | $\overline{X_i}$ |
| II | 1 | 0 | $\overline{X_i}$ | ($\overline{X_i}$) | 1 | $\overline{X_i}$ |
| III | 0 | 1 | ($X_i$) | $\overline{X_i}$ | 0 | $X_i$ |
| III | 0 | 1 | $X_i$ | ($\overline{X_i}$) | 1 | $\overline{X_i}$ |
( ) IS SELECTED BY THE CARRY INPUT
*FIG. 5*
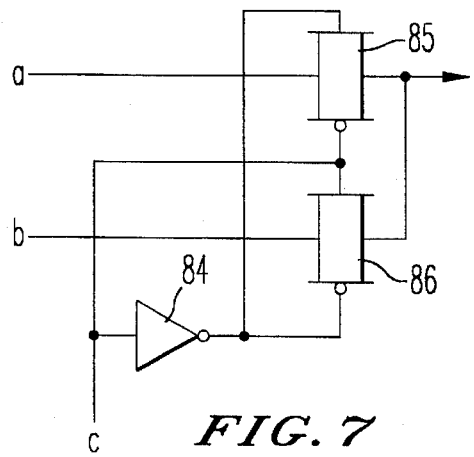
*FIG. 7*
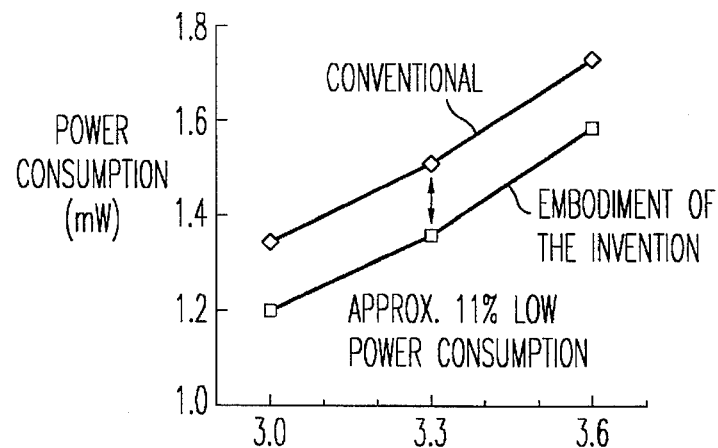
*FIG. 8*

CARRY SELECTING SYSTEM TYPE ADDER

BACKGROUND OF THE INVENTION

1. Field of the Invention

The present invention relates to an adder, in particular, to a carry selecting system type adder.

2. Discussion of the Background

As a conventional adder, a ripple carry type is known. In this adder, the adding of an augend and an addend for each bit is executed after receiving a carry input signal from an adding circuit disposed in a preceding stage.

However, in this adder, until the addition of the most significant bit is executed, due to delay of carry propagation, the entire processing performance of the microprocessor is deteriorated. To prevent the delay of the carry propagation, it is known that a carry selecting system type adder executes an addition corresponding to two carry inputs beforehand.

FIG. 9 is a schematic diagram showing the construction of the carry selecting system type adder described in, for example, Japanese Patent Laid-Open Publication No. Hei 5-6263. In the drawing, the carry selecting system type adder is constructed of an AND device 1, exclusive OR devices 2–4, an OR device 5, a carry generating signal circuit 6, and a carry propagating signal circuit 7. In this adder relating to an addition of the augend A and the addend B, a sum (sum S0) in the case that the carry input value is "0" and a sum (sum S1) in the case that the carry input value is "1" are simultaneously calculated by the OR device 5 and the exclusive OR devices 3 and 4 disposed in one adder.

FIG. 10 is a detailed circuit diagram showing a 4-bit carry selecting system type adder using the adder shown in FIG. 9. In FIG. 10, the 4-bit carry selecting system type adder is constructed of AND devices 8–14, exclusive OR devices 15–26, OR devices 27–30, first selector circuits 31–34, and second selector circuits 35–38. The carry generating signal circuit 6 and the carry propagating signal circuit 7 shown in FIG. 9 are constructed of the first selector circuits 31 to 33 and the AND devices 12 to 14 shown in FIG. 10. One of two sums (sum S0 and sum S1) generated at the same time is selected by the second selectors 34 to 38 based on the carry input value, and output as carry outputs SUM0 to SUM3. Thus, the delay of carry propagation is removed.

Since the conventional adder is constructed as described above, the following problems take place.

The improvement of the processing performance of adders contributes to one factor in the improvement of the processing performance of a microprocessor incorporating the adder. To construct a high speed adder, a parallel process is effectively used. However, the parallel process requires an increase of the amount of hardware, thereby increasing the area of the microprocessor and adversely affecting the layout of the existing chips. Thus, it is important to design the adder so that the amount of hardware required is reduced.

In the above-described adder, exclusive OR devices and AND devices are used so as to calculate added results in the case that the carry input is "0" and in the case that the carry input is "1" at the same time. Thus, the amount of hardware required becomes large, and thereby power consumption increases. The chip area and power consumption of microprocessors are required to decrease, year by year. Thus, the amount of hardware and power consumption of the adder that is an essential portion of a calculating process of the microcomputer must be further decreased.

SUMMARY OF THE INVENTION

The present invention solves the above-mentioned problems. An object of the present invention is to reduce the amount of hardware and power consumption of at least one adder used in a carry selecting system which executes the addition of two carry inputs beforehand.

An adder according to the invention comprises a first exclusive OR device; a second exclusive OR device for receiving an output of the first exclusive OR device and a generating signal $G(i-1)$ that is a carry generate signal, exclusive ORing the output of the first exclusive OR device and the generating signal $G(i-1)$, and outputting the calculated result as a sum $Si0$; and a third exclusive OR device for receiving an output of the second exclusive OR device and a propagating signal $P(i-1)$ that is a carry propagate signal, exclusive ORing the output of the second exclusive OR device and the propagating signal $P(i-1)$, and outputting the calculated result as a sum $Si1$.

Accordingly, the present invention is advantageous in that since the values of two sums in the case that the carry input value is "0" and in the case that the carry input value is "1" are generated by a combination of the two exclusive OR devices, which are the second exclusive OR device and the third exclusive OR device, the amount of hardware and the power consumption of the adder can be reduced.

Other objects and advantages of this invention will become apparent from the detailed description given hereinafter. It should be understood, however, that the detailed description and specific embodiment are given by way of illustration only, since various changes and modifications within the spirit and scope of the invention will become apparent to those skilled in the art from the detailed description.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 is a schematic diagram showing the relation between signals of circuit construction shown in FIG. 4 and signals corresponding thereto;

FIG. 7 is a circuit diagram showing a detailed construction of a second selector circuit shown in FIG. 6;

FIG. 8 is a comparative characteristic diagram showing the relation between power consumption of the embodiment of the invention and that of the conventional adder;

DETAILED DESCRIPTION OF THE PREFERRED EMBODIMENTS

Figure 1:
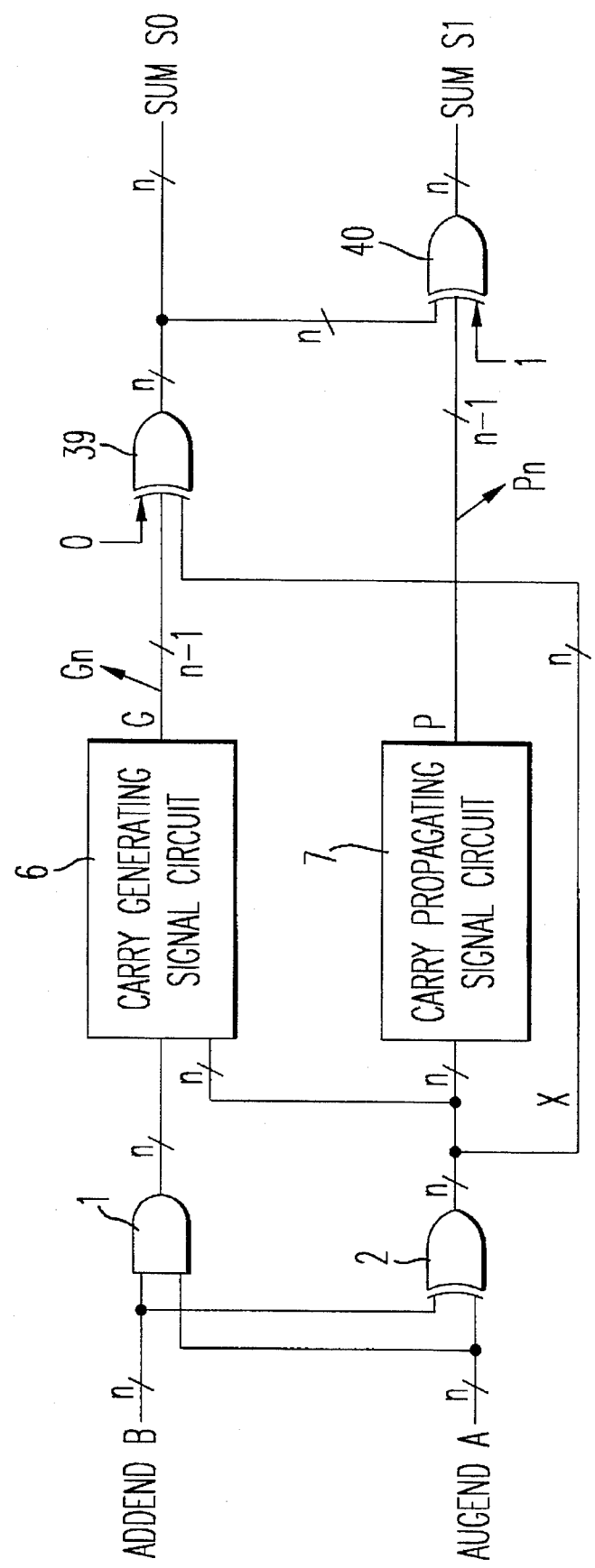
FIG. 1 is a circuit diagram showing a basic construction of an adder according to an embodiment of the invention.

FIG. 1 is a schematic diagram showing a basic construction of an adder according to an embodiment of the present invention. The adder shown in FIG. 1, is constructed of the AND device 1, the exclusive OR device 2, the carry generating signal circuit 6, the carry propagating signal circuit 7, and exclusive OR devices 39, 40. The exclusive OR device 39 receives output signals of the carry generating signal circuit 6 and the exclusive OR device 2, and outputs a sum S0 in the case that the carry input value is "0". The exclusive OR device 40 receives output signals of the carry propagating signal circuit 7 and the exclusive OR device 39, and outputs a sum SI in the case that the carry input value is "1". A generating signal G and a propagating signal P are generally represented by the following logical formulas. In the following logical formulas, "·" represents an AND operation. "+" represents an OR operation. "⊕" represents an exclusive OR operation.

$$Gi = gi + Gi - 1 \cdot Xi \quad (1)$$
$$Pi = Xi \cdot Pi - 1 \cdot \quad (2)$$
$$G0 = A0 \cdot pi - 1 \quad (3)$$
$$P0 = A0 \oplus B0 \quad (4)$$

where gi=Ai·Bi, Xi=Xi=Ai⊕Bi, i=1 to N (N is an integer)

When a generating signal Gi is generated, a carry signal is unconditionally generated at bit i. When a propagating signal Pi is generated, a carry input received from a preceding stage is propagated as a carry signal. The generating signal Gi and the propagating signal Pi are not generated at the same time.

Figure 2:
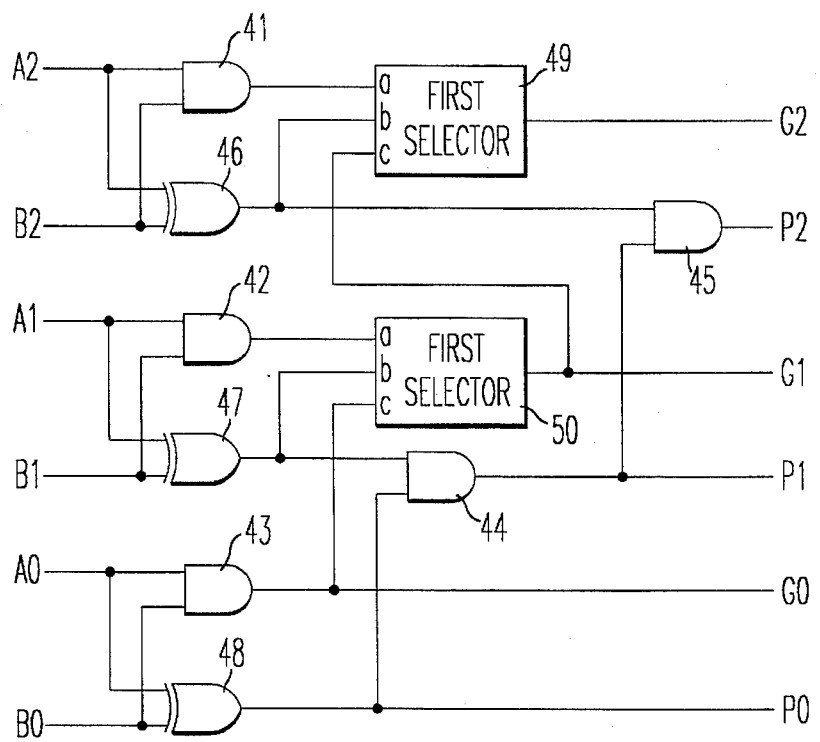
FIG. 2 is a schematic diagram showing a detailed construction of a carry generating signal circuit 6 and a carry propagating signal circuit 7 shown in FIG. 1.
Figure 3:
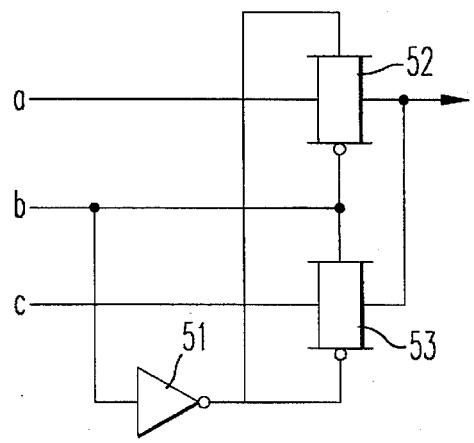
FIG. 3 is a circuit diagram showing a detailed construction of first selector circuits 49 and 50 shown in FIG. 2.

FIG. 2 shows a circuit corresponding to the logical formulas (1) to (4). In addition, FIG. 2 shows a practical construction of the carry generating signal circuit 6 and the carry propagating signal circuit 7 of FIG. 1. FIG. 3 is a schematic diagram showing a detailed construction of the first selector circuits 49 and 50 shown in FIG. 2. The first selector circuits 49 and 50 are constructed of six transistors. The construction of these circuits is the same as or equivalent to that of the circuits of the conventional adder. In FIG, 2, the carry generating signal circuit 6 and the carry propagating signal circuit 7 are constructed of AND devices 41–45, exclusive OR devices 46–48, and first selector circuits 49 and 50. Each the first selector circuits 49 and 50 shown in FIG. 3, is constructed of an inverter circuit 5 1, and transmission gates 52 and 53. The circuit shown in FIG. 3 selects, based on the result of Ai⊕Bi (exclusive OR shown in FIG. 2) that is input to a terminal b, one of the output signal of the AND of Ai·Bi (shown in FIG. 2) that is input to a terminal a and the generating signal (carry signal shown in FIG. 2) that is input to a terminal c.

Next, logical formulas that are obtained corresponding to the construction of the circuit that obtains the sum Si0 in the case that the carry input value for each bit (bit i) is "0" and the sum Si1 in the case that the carry input value for each bit (bit i) is "1" will be described. In the following logical formulas, the circuit construction of the embodiment of the invention is logically expressed using the generating signal G(i–1), the propagating signal P(i–1), and the exclusive OR Xi of Ai and Bi.

$$Si0 = Xi \oplus Gi - 1 \quad (5)$$
$$Si1 = Xi \oplus (Gi - 1 + Pi - 1)$$

When the logical formula of Si1 is modified, $Sij = Xi \oplus_1 (Gi - 1 + Pi - 1)$
$= Xi \oplus \{Gi - \underline{1 \cdot (Pi - 1 + \overline{Pi - 1}}) + (Gi - 1 + \overline{Gi - 1}) \cdot Pi - 1\}$
(where $Pi - 1 + \overline{Pi - 1} = 1$, $Gi - 1 + \overline{Gi - 1} = 1$)
$= Xi \oplus \{Gi - 1 \cdot \overline{Pi - 1} + \overline{Gi - 1} \cdot Pi - 1 + Gi - 1 \cdot Pi - 1 + Gi - 1 \cdot Pi - 1\}$
$= Xi \oplus (Gi - 1 \cdot \overline{Pi - 1} + \overline{Gi - 1} \cdot Pi - 1)$
(where $Gi - 1 \cdot Pi - 1 = 0$)
$= Xi \oplus (Gi - 1 \oplus Pi - 1)$
$= Xi \oplus Gi - 1 \oplus Pi - 1$ Thus, $$Sij = Xi \oplus Gi - 1 \oplus Pi - 1 \quad (6)$$
$$( = Si0 \ominus Pi - 1)$$

Thus, it is clear that Si0 can be used to generate Si1.
In addition, $$S00 = X0 \oplus 0 \quad (7)$$
$$= X0$$
$$S01 = X0 \oplus 1 \quad (8)$$
$$= \overline{X0}$$

When the logical formula of S01 is modified,
$S01 = X0 \oplus 1$
$= (X0 \oplus 1) \oplus 0$
$= (X0 \oplus 0) \oplus 1$
$= \overline{X0}$
$= (S00 \oplus 1)$ In the above logical formulas, i is an integer from 1 to n. Thus, it is clear that S00 can be used to generate S01.

Figure 4:
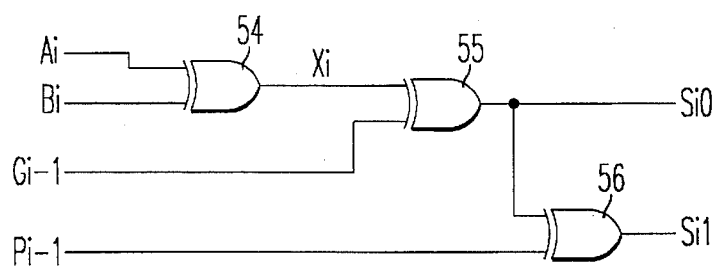
FIG. 4 is a circuit diagram showing a circuit that obtains two types of sums according to the embodiment of the invention.

The sums S0 and S1 corresponding to A0 and B0 are represented by the logical formulas (7) and (8) because the generating signal G and the propagating signal P are not received from the preceding stage. FIG. 4 is a schematic diagram showing a circuit that obtains two types of sums corresponding to the logical formulas (5) to (8). In FIG. 4, exclusive OR devices 54 to 56 correspond to first to third exclusive OR devices, respectively. As a feature, in FIG. 4, since the two exclusive OR devices 55 and 56 are combined, Si0 and Si1 obtained by the logical formulas (5) and (6) are generated. The reason why S00 is X0 is that when the carry input is "0", X0 is not inverted, but directly output. The reason why S01 is $\overline{X0}$ is that since the carry input is "1", X0 is inverted.

FIG. 5 shows the relation between the circuit construction and signals shown in FIG. 4. In an exclusive OR device, when one input value is "0", the other input value becomes an output value. On the other hand, when one input value is "1", the inverted value of the other input value becomes the output value. When both G(i–1) and P(i–1) are "0" (in the case I of FIG. 5), since both the generating signal and the propagating signal are not generated, the value of Xi (truth SUM) is obtained as SUM. Because of the logical formulas (5) and (6), Si0 and Si1 become $\overline{XI}$. Even if either of Si0 and Si1 is selected corresponding to the carry input, since SUM becomes $\overline{XI}$, it is clear that the correct value is selected. When G(i–1) is "1" and P(i–1) is "0" (in the case II of FIG. 5), since the generating signal is generated, it is considered that SUM is the value of Xi (real SUM) is generated as SUM. Because of the logical formulas (5) and (6), Si0 and Si1 become $\overline{XI}$. Even if either of Si0 and Si1 is selected corresponding to the carry input, since SUM becomes $\overline{XI}$, it is clear that the correct value is selected. When G(i–1) is "0" and P(i–1) is "1" (in the case III of FIG. 5), the propagating signal is received from the preceding stage. Thus, when the carry input is "0", SUM is $\overline{XI}$. In addition, when the carry input is "1", SUM is $\overline{XI}$. Because of the logical formulas (5) and (6), Si0 and Si1 become Xi and $\overline{Xi}$, respectively. Since Xi and $\overline{Xi}$ are selected corresponding to the carry input, it is clear that the correct value is selected.

Figure 6:
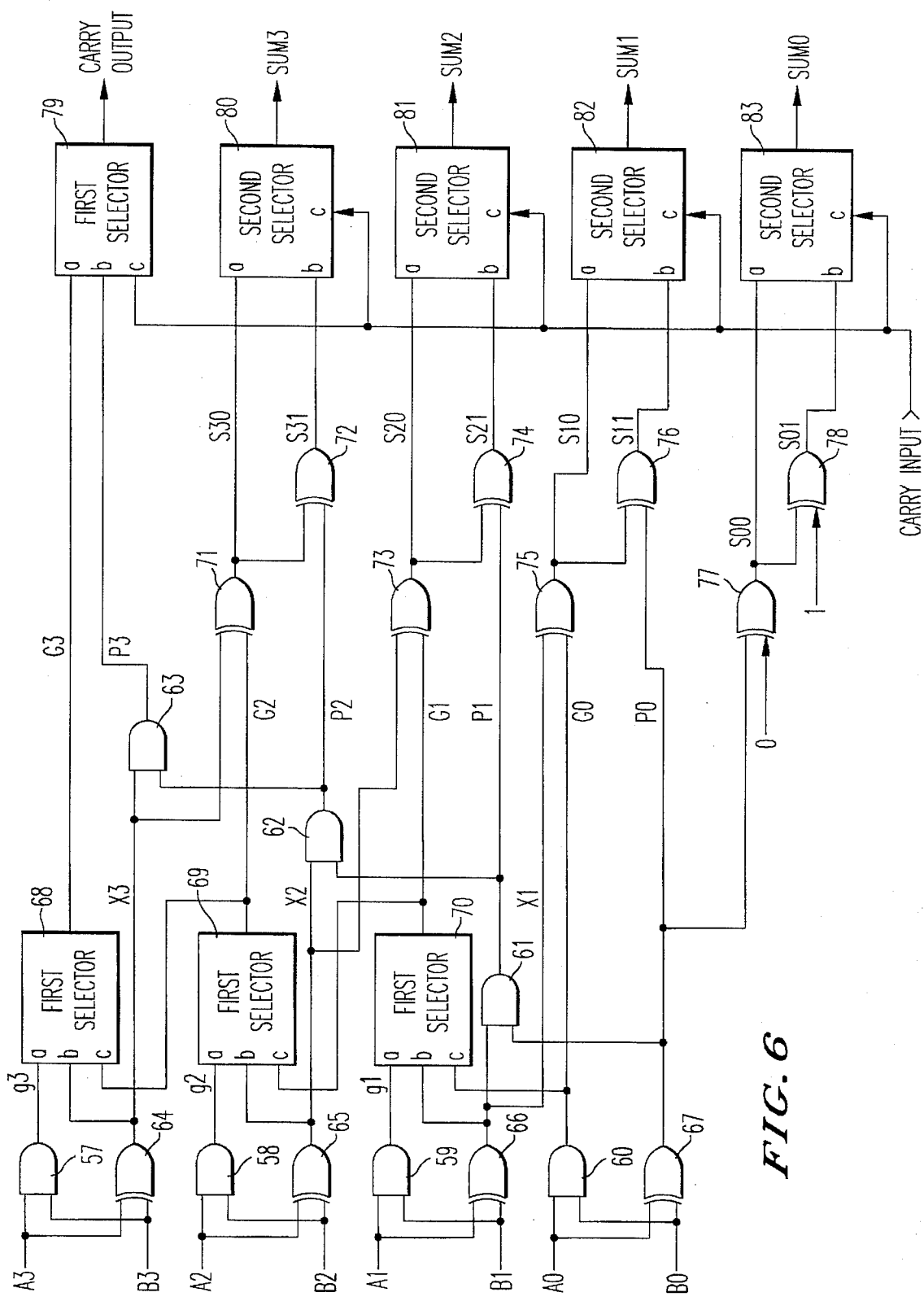
FIG. 6 is a circuit diagram showing a detailed construction of a 4-bit carry selecting system type adder using the circuit construction shown in FIG. 4 according to the embodiment of the invention.
Figure 9:
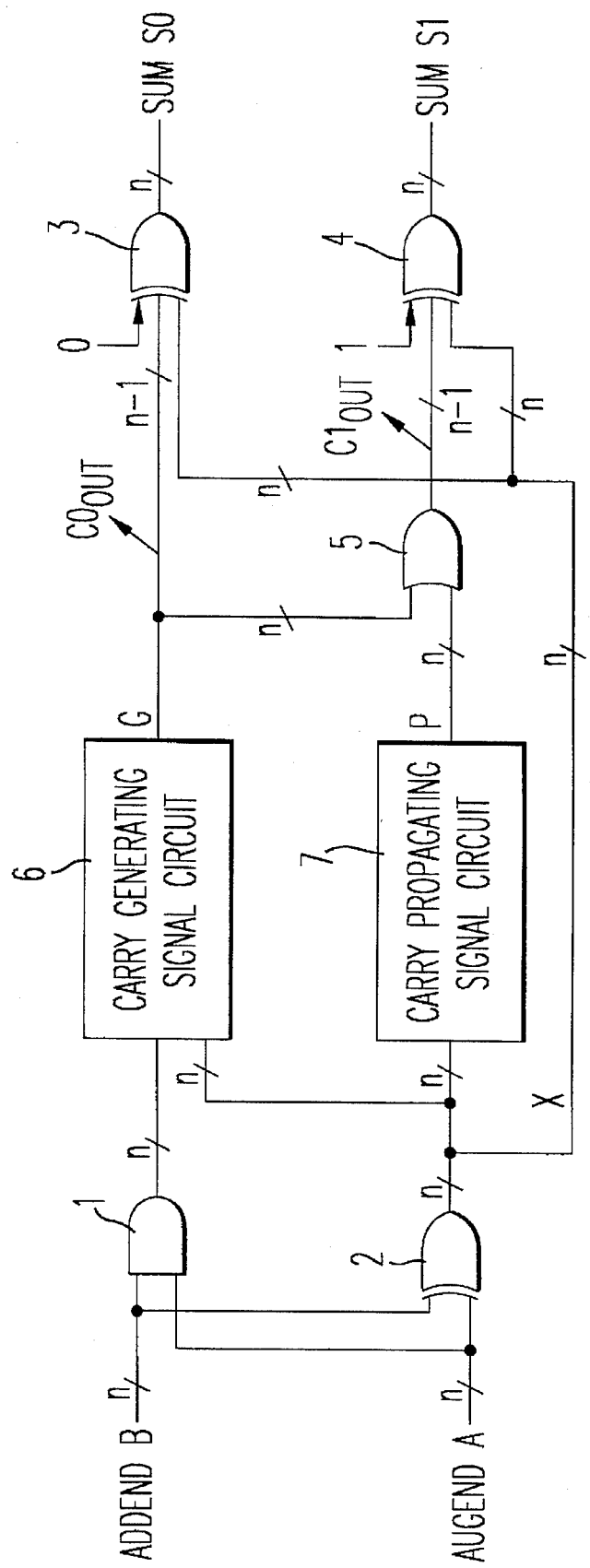
FIG. 9 is a circuit diagram showing the construction of a conventional carry selecting system type adder.

Next, with the circuit construction shown in FIG. 4, the detail of a 4-bit carry selecting system type adder shown in FIG. 6 will be described as an embodiment of the invention. In FIG. 6, each of AND devices 57 to 60 executes Ai (A0, A1, A2, and A3) AND Bi (B0, B1, B2, and B3) for each bit and determines whether or not generating signal gi (g1, g2, and g3) is generated for bit i. Each of AND devices 61 to 63 receives a signal Xi that represents whether or not a propagating signal P(i exclusive OR circuits 1) received from the preceding stage is propagated to the next stage and generates a propagate signal P(i−1). Each of exclusive OR devices 64 to 67 correspond to first exclusive OR devices, generates the above-mentioned signal Xi. Each of first selector circuits 68 to 70 selects, based on the signal Xi that is input to the terminal b, either of the generating signal gi that is input to the terminal a and the generating signal G(i−1) that is received from the preceding stage through the terminal c, and outputs the selected signal as a generating signal Gi. The circuit construction of the first selector circuits 68 to 70 shown in FIG. 6 is equivalent to that shown in FIG. 3. Exclusive OR circuits 71, 73, and 75 correspond to the second exclusive OR devices, exclusive OR circuits 72, 74, and 76 correspond to the third devices, exclusive OR circuit 77 corresponds to the fourth device, and exclusive OR circuit 78 corresponds to the fifth device. These devices are connected corresponding to the circuit construction shown in FIG. 4. As output signals, two sums Si0 and Si1 are generated. A first selector circuit 79 selects either of the generating signal Gn (G3) and the carry input signal based on the propagating signal Pn (P3), and outputs the selected result as the carry output value. In this embodiment, n=3 is considered. However, the detailed circuit construction of the first selector circuit 79 is the same or equivalent to that shown in FIG. 3. Reference numerals 80 to 83 are second selector circuits. Each of the second selector circuits 80 to 83 selects either of two sums Si0 and Si1 that are input to the terminals a and b based on the carry input value that is input the terminal c, and outputs the selected result as one of the carry outputs SUMI to SUM3.

FIG. 7 is a detailed circuit diagram showing the second selector circuits 80 to 83. Each of the second selector circuits 80 to 83 is constructed of an inverter 84 and transmission gates 85 and 86. More specifically, the second selector circuit is constructed of six transistors.

The circuits shown in FIGS. 6 and 7 are constructed for four bits corresponding to the logical formulas (1) to (8). Thus, since the operations of these circuits basically accord with the logical formulas, the description is omitted.

Next, features of the circuit shown in FIG. 6 will be described. In FIG. 6, the 4-bit adder obtains two sums Si0 and Si1 simultaneously and selects either of them corresponding to the carry input value. In accordance with the conventional adder, a circuit that generates Si0 and Si1 simultaneously is added to a conventional ripple carry type adder so as to select a carry. Thus, the area of the added circuit and the power consumption thereof increase.

To prevent this problem, in the embodiment according to the invention, the generating signal G(i−1), the propagating signal P(i−1), and the values of exclusive OR Xi (X1, X2, and X3) of Ai (A1, A2, and A3) and Bi (B1, B2, and B3) are used, and the carry selecting system corresponding to the logical formulas (5) to (8) is accomplished so as to reduce the amount of hardware of a single adder and the power consumption thereof.

Figure 10:
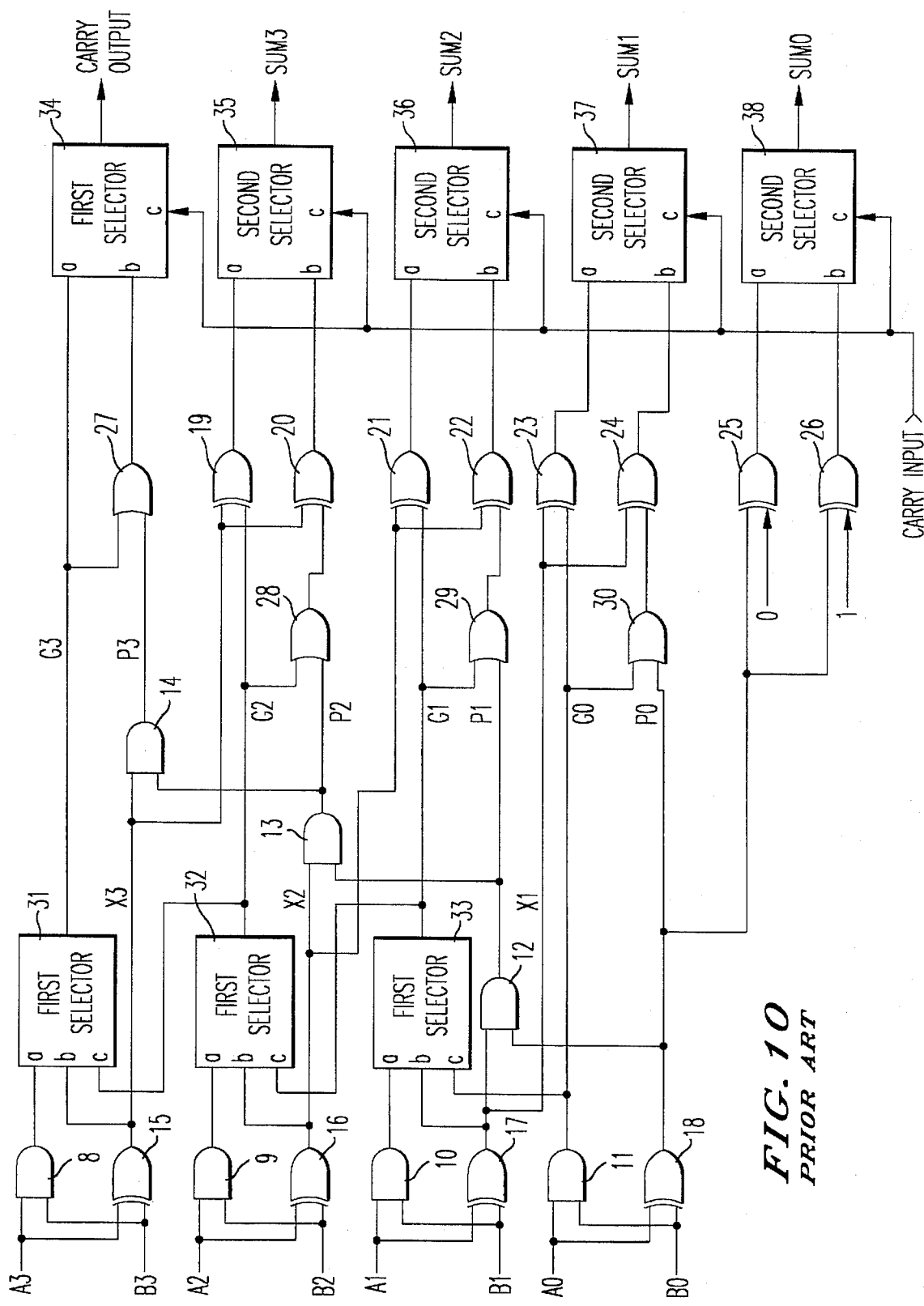
FIG. 10 is a detailed circuit diagram showing a conventional 4-bit carry selecting system type adder using the adder shown in FIG. 9.

Next, the number of transistors used in the conventional adder shown in FIG. 10 and that of the embodiment of the invention shown in FIG. 6 are counted and compared. When each of the exclusive OR devices is constructed of eight transistors and each of the AND devices and OR devices is constructed of four transistors (each of the first and second selector circuits are constructed of six transistors), the number of total transistors of the conventional adder is 188. On the other hand, the number of total transistors of the adder according to the embodiment of the invention is 172. Thus, it is clear that the amount of hardware of the embodiment of the invention is reduced by approximately 9% in comparison with that of the conventional adder.

According to "SPICE" simulation conducted in the conditions of a 0.5 μm CMOS process, a clock frequency of 200 MHz, a gate operating ratio of 50%, and room temperature, the results relating to the power consumption as shown in FIG. 8 were obtained. In other words, according to the embodiment of the invention, when the power voltage was 3.3 V, the power consumption was 1.33 mW. Since the power consumption of the conventional adder was 1.49 mW, according to the embodiment of the invention, the power consumption can be reduced by approximately 11%. Thus, it is clear that the power consumption of the present invention is lower than that of the conventional adder.

On the other hand, since it is predicted that low voltage operation microprocessors will become mainstream in the future, the low-power-consumption type adder that performs the calculations of the microprocessor is effectively used. From this point of view, the invention is very suitable for the following applications:

(1) An adder for a microprocessor that is mounted in an electronic unit driven by a primary cell or a secondary cell (rechargeable cell).

(2) An adder mounted in a one-chip semiconductor device.

(3) An adder mounted in each microprocessor that is processed in parallel.

In addition, an adder according to the embodiment of the invention comprises a first exclusive OR device a second exclusive OR device for receiving an output of the first exclusive OR device and a generating signal G(i−1) that is a carry generate signal, exclusive ORing the output of the first exclusive OR device and the generating signal G(i−1), and outputting the calculated result as the sum Si0; and a third exclusive OR device for receiving an output of the second exclusive OR device and a propagating signal P(i−1) that is a carry propagate signal, exclusive ORing the output of the second exclusive OR device and the propagating signal P(i−1), and outputting the calculated result as the sum Si1, wherein since the values of two sums in the case that the carry input value is "0" and in the case that the carry input value is "1" are generated by a combination of the two exclusive OR devices, which are the second exclusive OR device and the third exclusive OR device, the amount of hardware of the adder and the power consumption thereof can be reduced.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A carry selecting system type adder comprising:

a first exclusive OR device for receiving an augend Ai and an addend Bi and performing an exclusive OR operation on said augend and said addend, i being an integer and ranging from 1 to N;

a second exclusive OR device for receiving an output of said first exclusive OR device;

a carry signal generating circuit for generating a carry generate signal G(i–1), wherein said second exclusive OR device performs an exclusive OR operation on said output of said first exclusive OR device and said carry generate signal to calculate a sum Si0 in a case that a carry input value for each bit of said augend and said addend is "0", and outputting the sum Si0;

a third exclusive OR device for receiving an output of said second exclusive OR device; and a carry propagate signal circuit for generating a carry propagate signal P(i–1), wherein said third exclusive OR device performs an exclusive OR operation on said output of said second exclusive OR device and said carry propagate signal to calculate a sum Si1 in the case that the carry input value for each bit of said augend and said addend is "1", and outputting the sum Si1.

2. An adder according to claim 1, further comprising:

a fourth exclusive OR device having a first input connected to an output of the first exclusive OR device and having a second input receiving the carry generate signal and for performing an exclusive OR operation on a least significant bit A0 of said augend and the value "0" to obtain a sum S00 in the case that the carry input value for each bit of said augend and said addend is "0"; and a fifth exclusive OR device having inputs connected to an output of the fourth exclusive OR device and the carry input value and for performing an exclusive OR operation on an output of said fourth exclusive OR device and the value "1" to obtain a sum S01 in the case that the carry input value for each bit of said augend and said addend is "1".

3. An adder according to claim 1, wherein said adder is implemented as a one-chip semiconductor device.

4. An adder according to claim 3, wherein said semiconductor device is utilized in a microprocessor.

5. An adder according to claim 4, wherein said microprocessor is operated by a battery.

6. An adder according to claim 4, wherein an operating voltage of said microprocessor is less than 3.6 V.

* * * * *